US009524450B2

(12) United States Patent
Ravindran et al.

(10) Patent No.: US 9,524,450 B2
(45) Date of Patent: Dec. 20, 2016

(54) DIGITAL IMAGE PROCESSING USING CONVOLUTIONAL NEURAL NETWORKS

(71) Applicant: Accenture Global Service Limited, Dublin (IE)

(72) Inventors: Arun Ravindran, Brooklyn, NY (US); Ozlem Celik-Tinmaz, Guttenberg, NJ (US); Mohamed Badawy, Irving, TX (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/638,873

(22) Filed: Mar. 4, 2015

(65) Prior Publication Data
US 2016/0259994 A1   Sep. 8, 2016

(51) Int. Cl.
*G06K 9/00* (2006.01)
*G06K 9/62* (2006.01)
(Continued)

(52) U.S. Cl.
CPC ............... *G06K 9/6267* (2013.01); *G06K 9/00* (2013.01); *G06K 9/4628* (2013.01); *G06N 3/04* (2013.01); *G06N 3/08* (2013.01)

(58) Field of Classification Search
CPC ........ G06F 17/2785; G06F 8/30; G06F 3/005; G06N 99/005; G06N 3/08; G06N 3/049; G06N 3/02; G06K 9/626; G06K 9/6267; G06K 9/00456; G06K 9/00281; G06K 9/00288; G06K 9/6282; G06K 9/6284; G06K 9/6292; G06K 9/6255; G06K 9/3241; G06K 9/325; G06K 9/00248; G06K 9/6218; G06K 9/4628; G06K 9/00221; G06K 2209/05; G06K 9/00315; G06K 9/00664; G06K 9/3258; H04N 5/23238; H04N 7/181; H04N 5/23222; H04N 2201/3252; H04N 5/367; G06T 2207/20084; G06T 2207/20016;G06T 5/007; G06T 2207/20081; G06T 3/4046; G06T 2207/10004; G06T 7/0012; G06T 9/002; H04L 12/16; G10L 15/16
(Continued)

(56) References Cited

U.S. PATENT DOCUMENTS 7,912,246 B1 * 3/2011 Moon ................ G06K 9/00221
382/103
2005/0185835 A1 * 8/2005 Matsugu ............. G06K 9/4619
382/159
(Continued)

FOREIGN PATENT DOCUMENTS

EP         1378855 A2     1/2004

OTHER PUBLICATIONS deep learning.net, "Convolutional Neural Networks (LeNet)", http://deeplearning.net.tutorial/lenet.html, Retrieved on Feb. 6, 2015, 10 pages.
(Continued)

*Primary Examiner* — Vu Le
*Assistant Examiner* — Aklilu Woldemariam
(74) *Attorney, Agent, or Firm* — Mannava & Kang, P.C.

(57) ABSTRACT

According to an example, a digital image may be processed by an ensemble of convolutional neural networks (CNNs) to classify objects in the digital image. For each CNN, a candidate architecture and candidate parameters may be selected to build a plurality of CNNs. Once it is determined that a predetermined number of CNNs, each having different values for the selected candidate parameters, meet a validation threshold, an ensemble of CNNs may be generated from the predetermined number of CNNs. The predictions from the ensemble of CNNs may then be aggregated to accurately classify the objects in the digital image.

13 Claims, 6 Drawing Sheets

(51) Int. Cl.
  *G06K 9/46* (2006.01)
  *G06N 3/04* (2006.01)
  *G06N 3/08* (2006.01)
(58) Field of Classification Search
  USPC ......... 382/140, 157, 176, 190, 138; 345/502
  See application file for complete search history.

(56) References Cited

U.S. PATENT DOCUMENTS

| | | | |
|---|---|---|---|
| 2005/0251427 A1 | 11/2005 | Dorai et al. | |
| 2006/0115157 A1* | 6/2006 | Mori | G06K 9/00221 382/190 |
| 2006/0204053 A1* | 9/2006 | Mori | G06K 9/00 382/118 |
| 2008/0212098 A1* | 9/2008 | Sato | G06K 9/3241 356/400 |
| 2009/0182693 A1 | 7/2009 | Fulton et al. | |
| 2011/0211036 A1* | 9/2011 | Tran | H04N 5/23238 348/14.08 |
| 2014/0270347 A1* | 9/2014 | Xu | G06K 9/6282 382/103 |
| 2014/0355861 A1* | 12/2014 | Nirenberg | H04N 19/85 382/133 |
| 2015/0117760 A1* | 4/2015 | Wang | G06K 9/4628 382/157 |
| 2015/0139485 A1* | 5/2015 | Bourdev | G06K 9/00362 382/103 |
| 2015/0332126 A1* | 11/2015 | Hikida | H04N 5/23229 348/223.1 |
| 2015/0347860 A1* | 12/2015 | Meier | G06K 9/72 382/140 |
| 2015/0347861 A1* | 12/2015 | Doepke | H04N 5/23245 382/199 |
| 2016/0034814 A1* | 2/2016 | Audhkhasi | G06N 3/08 706/12 |
| 2016/0054452 A1* | 2/2016 | Cosatto | G01S 19/51 701/412 |

OTHER PUBLICATIONS

Sharkey, Amanda J.C., "Combining Artificial Neural Nets: Ensemble and Modular Multi-Net Systems", Springer-Vertag, Jun. 26, 1998, 30 pages.

Robi Polikar et al: "Learn++: An Incremental Learning Algorithm for Supervised Neural Networks", IEEE Transactions on Systems, Man, and Cybernetics: Part C:Applications and Reviews, vol. 31, No. 4; Nov. 1, 2001 (Nov. 1, 2001), 12 pages.

Opitz D W et al: "Generating Accurate and Diverse Members of a Neural-network Ensemble", Advances in Neural Information Processing Systems, vol. 8, Jan. 1, 1996 (Jan. 1, 1996), pp. 535-541.

Ciresan D et al: "Multi-column deep neural networks for image classification", IEEE Conference on Computer Vision and Pattern Recognition, Jun. 16, 2012 (Jun. 16, 2012), pp. 3642-3649.

Alex Krizhevsky et al: "ImageNet classification with deep convolutional neural networks", The 26th annual conference on Neural Information Processing Systems (NIPS ' 25): Dec. 3-8, 2012, Dec. 6, 2012 (Dec. 6, 2012).

Amanda J. C. Sharkey et al: "The "Test and Select" Approach to Ensemble Combination" In: "Correct System Design", Jan. 1, 2000 (Jan. 1, 2000), Springer International Publishing, Cham 032548, vol. 1857, 16 pages.

Leon N Cooper et al: "When networks disagree: Ensemble methods for hybrid neural networks", In: "How We Learn; How We Remember: Toward an Understanding of Brain and Neural Systems", Oct. 27, 1992 (Oct. 27, 1992), World Scientific, XP055285260, 16 pages.

Yuan, J. et al., 'Half-CNN: A General Framework for Whole-Image Regression', arXiv:1412.6885, Dec. 22, 2014, pp. 1-9 [online], [retrieved from internet on Oct. 17, 2016]<URL:https://arxiv.org/abs/1412.6885>.

IP Australia, "Patent Examination Report No. 2", AU patent application No. 2016201292, Mailed date Oct. 17, 2016, 6 pages.

* cited by examiner

200

UNDAMAGED            DAMAGED            SEVERELY DAMAGED

DIGITAL IMAGE PROCESSING USING CONVOLUTIONAL NEURAL NETWORKS

BACKGROUND

Digital image processing typically involves processing a digital image, for example, from a digital still image or digital video, to ascertain, detect, and/or classify particular features or objects in the image. Pattern recognition may be applied during the image processing to detect a particular object in the image. Digital image processing with pattern recognition has been used in a wide variety of applications, such as facial recognition, detection of land features from aerial photographs, vehicle license plate determination, etc. Different types of conventional machine learning functions may be used for pattern recognition, however, many conventional machine learning functions are not adapted or may be difficult to adapt for pattern recognition in digital image processing.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
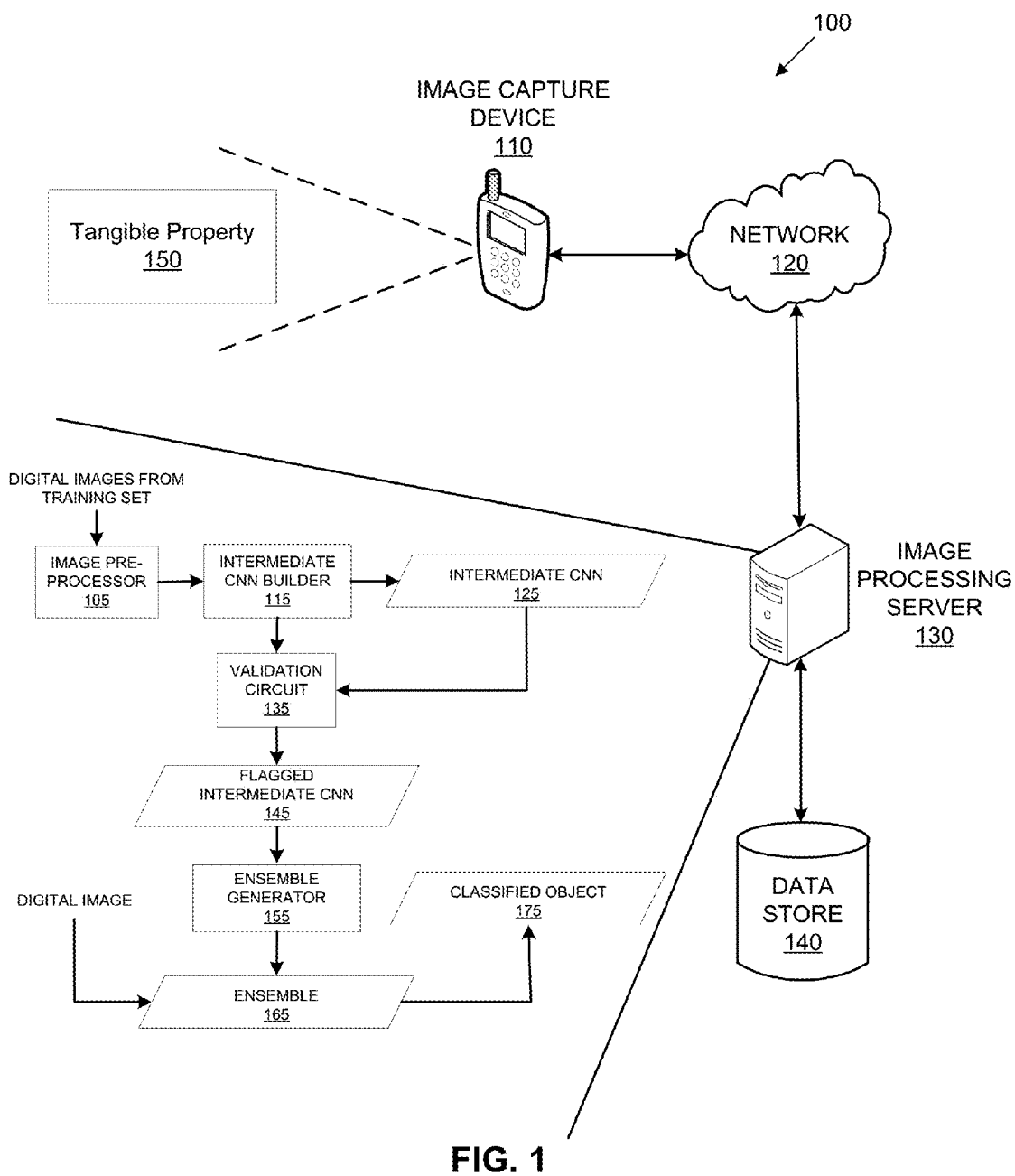
FIG. 1 shows a system diagram of an image processing system, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

An image processing system, according to an example, builds and trains an ensemble of deep learning models, such as convolutional neural networks (CNNs), to accurately and automatically perform image processing to detect particular attributes of objects in a digital image, and to classify the objects according to the detected attributes. CNNs, however, include many functional components, which make it difficult to determine the necessary network architecture that performs accurately to detect and classify particular features of images relevant for a problem in hand. Furthermore, each component of the CNN typically has a multitude of parameters associated with it. The specific values of those parameters necessary for a successful and accurate image classification are not known a priori without any application of a robust image processing system. The image processing system, therefore, provides a method for building and fine tuning CNNs proven to output an accurate classification of an image. Through an iterative process, a candidate architecture and candidate parameters for CNN may be selected to build, train, and optimize a CNN. For example, the iterative process may include selecting the candidate architecture from a plurality of candidate architectures and validating a set of candidate parameters for the selected candidate architecture. The candidate architecture may include a number of convolution layers and subsampling layers and a classifier type. The candidate parameters may include a learning rate, a batch size, a maximum number of training epochs, an input image size, a number of feature maps at every layer of the CNN, a convolutional filter size, a sub-sampling pool size, a number of hidden layers, a number of units in each hidden layer, a selected classifier algorithm, and a number of output classes. In addition, a pre-processing protocol may also be selected to enhance particular content in the images for the selected candidate architecture and selected candidate parameters.

The iterative process may include building an intermediate CNN using the training set and evaluating the performance of the intermediate CNN on a validation set. The evaluation, for instance, determines whether the intermediate CNN meets a validation threshold such as less than a 20% error rate. The iterative process is repeated until a predetermined number of intermediate CNNs (e.g., 25) meet the validation threshold. According to an example, each intermediate CNN has different values for the selected candidate parameters. An ensemble of the most accurate intermediate CNNs is then generated from the predetermined number of intermediate CNNs. The ensemble for example may be the top 5 most accurate intermediate CNNs. The next step may include selecting an ensemble algorithm to aggregate and/or combine the predictions of each intermediate CNN in the ensemble to form an ensemble prediction. The prediction of each intermediate CNN in the ensemble may then be used to classify an image or an object in the image.

The technical benefits and advantages of the disclosed examples include providing an advanced deep learning architecture that exhibits superior classification accuracy to assess property damage and an iterative image processing system that determines that advanced deep learning architecture. A CNN generated by the image processing system through an iterative process is easier to train than other regular, feed-forward neural networks and has fewer parameters to estimate, making it a more efficient architecture to use to assess property damage.

According to an example, a CNN generated by the image processing system may be used for classifying the extent of damage to a property that is captured in a digital image. Damage may refer to any kind of injury or harm that impairs the appearance of the property. An image or digital image may include both a still image and a moving image (e.g., video). The property may be any tangible object including, but not limited to, a house, furniture, clothing, vehicle equipment, land, computing device, toy, etc. In an example where an insured customer has accidental damage to tangible property, the insured customer may document the damage to the damaged property by taking digital photographs with a smart phone and/or camera. The digital images of the damaged property may then be fed into the image processing system. The image processing system may automatically classify the damaged property based on amount of damage determined from the image processing of the received digital images. In this example, the image processing system provides a machine vision method and apparatus to automatically detect the extent of damage to the property as captured in digital images.

According to an example, the image processing system generates an ensemble model (e.g., including multiple optimized CNNs) to classify an image or an object in the image with improved accuracy. In an example, the image processing system which used the ensemble model yielded an accuracy of nearly 90% on the images in the validation set.

As discussed above, according to an example, the image processing system may be used for classifying the extent of damage to property captured in an image. However, the image processing system may be used for substantially any application to classify features in a digital image into predefined categories.

With reference to FIG. 1, there is shown a system diagram of an image processing system 100, according to an example of the present disclosure. It should be understood that the system 100 may include additional components and that one or more of the components described herein may be removed and/or modified without departing from a scope of the system 100. The system 100 may include at least one image capture device 110, a communications network 120, an image processing server 130, and a data store 140.

The image capture device 110 may communicate with the image processing server 130 via the communications network 120. The image capture device 110 may be any computing device that includes a camera such as, but not limited to, a smartphone, a computing tablet, a laptop computer, a desktop computer, or any wearable computing device. According to an example, the image capture device 110 may capture an image of a tangible property 150 and send the image of the tangible property 150 to the image processing server 130 to automatically classify the extent of damage to the tangible property 150.

The communications network 120 may include local area networks (LANs) and wide area networks (WANs), such as the Internet. The communications network 120 may include signal bearing mediums that may be controlled by software, applications and/or logic. The communications network 120 may include a combination of network elements to support data communication services. For example, the communications network 120 may connect the image capture device 110 to the image processing server 130 through the use of a physical connection such as copper cable, coaxial cable, and fiber cable, or through wireless technology such as radio, microwave, or satellite.

The image processing server 130, for example, may receive digital images from a training set at an image pre-processor 105. The image pre-processor may crop and enhance particular content in the images from the training set to input into the intermediate CNN builder 115. The intermediate CNN builder 115 may select various architectures and parameters to train an intermediate CNN 125. The intermediate CNN 125 may be then be evaluated on a validation set that is generated by the validation circuit 135. The validation circuit 135 may determine whether to flag the intermediate CNN 125 as meeting a designated validation threshold. If the intermediate CNN 125 does not meet the validation threshold, the intermediate CNN is not flagged and continues to be trained on the digital images from the training set by the intermediate CNN builder 115. However, if the intermediate CNN 125 does meet the validation threshold, the intermediate CNN 125 is now a flagged intermediate CNN 145. As a result, the flagged intermediate CNN 145 is eligible to be selected as part of an ensemble of optimized CNNs that is generated by the ensemble generator 155. The ensemble generator 155, for example, may create an ensemble 165 of optimized CNNs. The predictions aggregated from the ensemble 165 may be used to accurately classify objects 175 from an inputted digital image. The processing functions of the image processing server 130 are further detailed below in FIGS. 4, 5, and 6.

Figure 2:
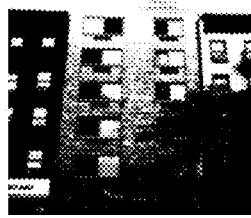
FIG. 2 shows classification categories that indicate the extent of damage to property, according to an example of the present disclosure.
Figure 2:
Figure 2:

According to an example, the image processing server 130 may receive an image of the tangible property 150 and automatically classify an extent of damage to the tangible property 150 using CNNs to recognize and classify the damage in the image of the tangible property 150. According to an example, the image processing server 130 may classify the extent of damage to the tangible property 150 into various predetermined classification categories 200 such as, but not limited to, undamaged, damaged, and severely damaged or totaled as illustrated in FIG. 2.

Figure 3:
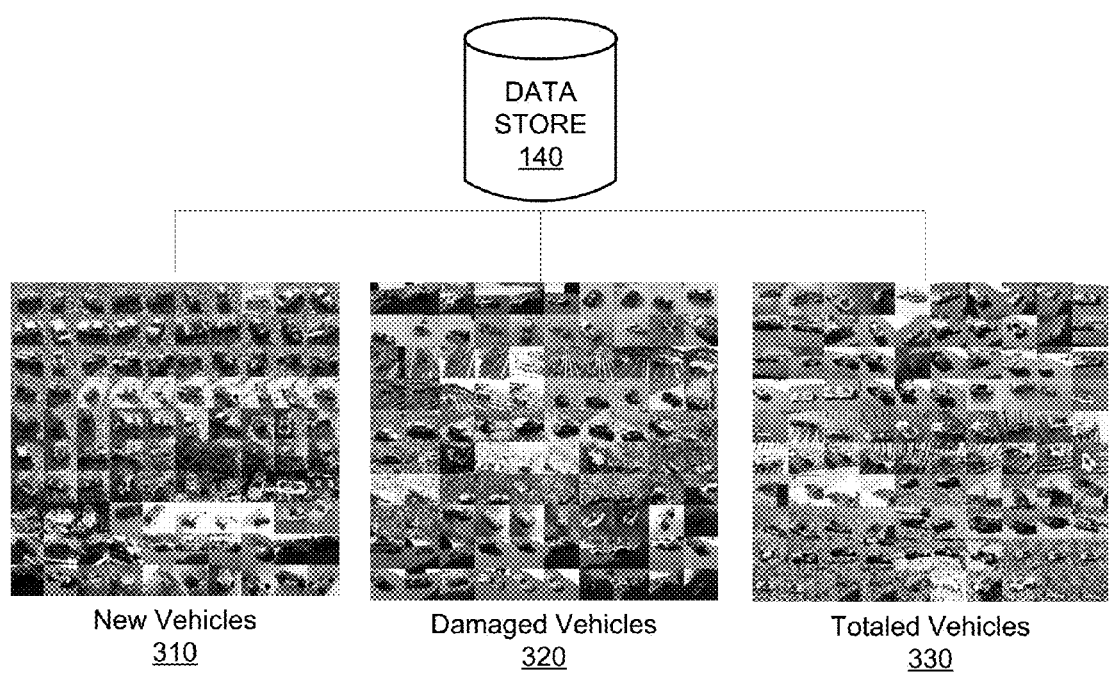
FIG. 3 shows a data store of an image processing server, according to an example of the present disclosure.

The image processing server 130 may be coupled to the data store 140, as further detailed below in FIG. 4. As illustrated in FIG. 3, the data store 140 may store data which is relied upon to classify the extent of damage to the tangible property 150 by the image processing server 130. For example, the data store 140 may store training sets and validation sets that comprise digital images of property 310, damaged property 320, and property that is a total loss 330. These digital images are relied upon by the image processing server 130 to build a model that accurately assesses and classifies the extent of damage to the tangible property 150.

Figure 4:
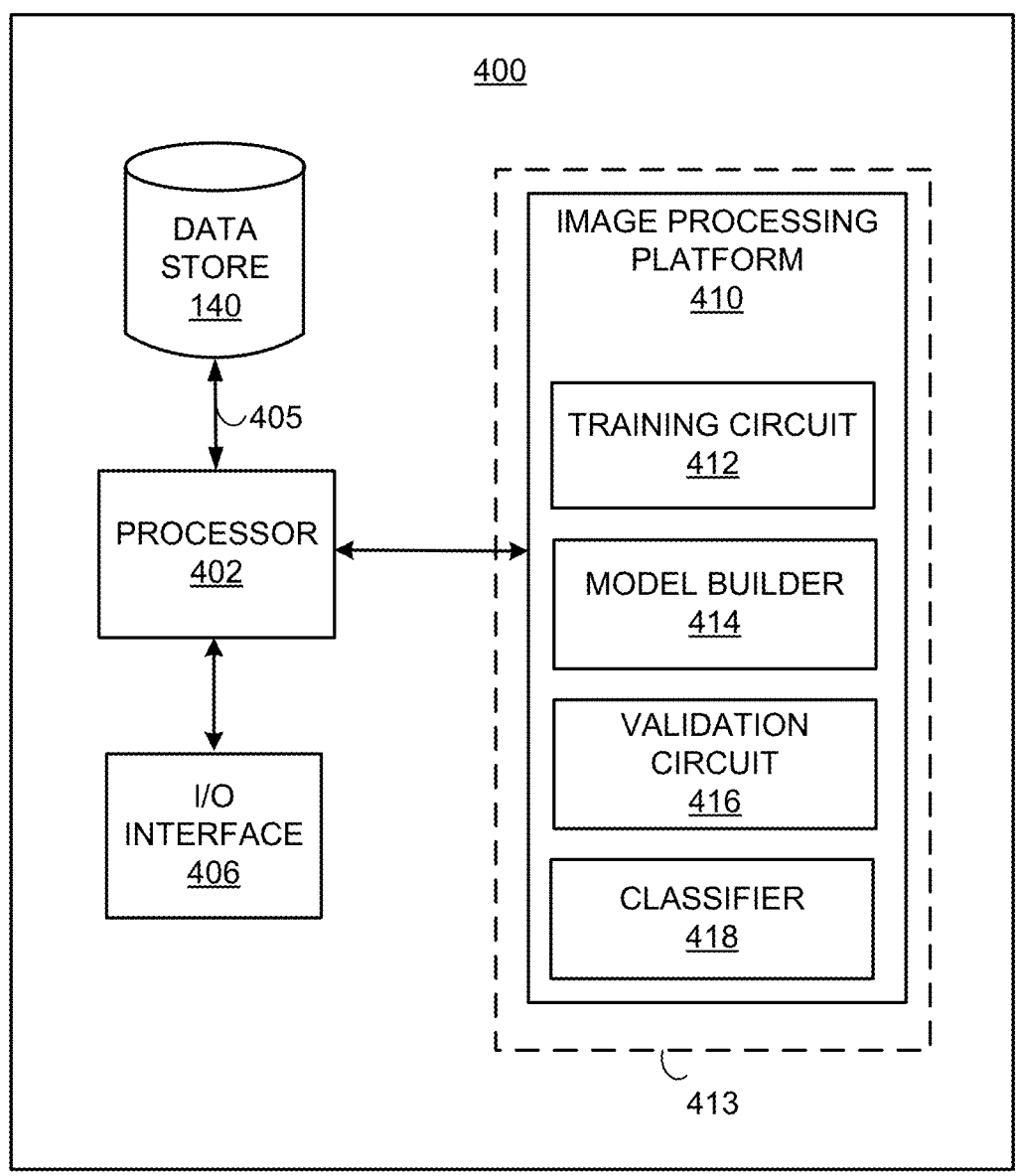
FIG. 4 shows a block diagram of a computing device for classifying objects in a digital image using convolutional neural networks (CNNs), according to an example of the present disclosure.

With reference to FIG. 4, there is shown a block diagram of a computing device 400 for image processing using convolutional neural networks (CNNs) according to an example of the present disclosure. According to an example, the computing device 400 is the image processing server 130. It should be understood that the computing device 400 may include additional components and that one or more of the components described herein may be removed and/or modified without departing from a scope of the computing device 400.

The computing device 400 is depicted as including a processor 402, a data store 140, an input/output (I/O) interface 406, and an image processing platform 410. The components of the computing device 400 are shown on a single computer or server as an example and in other examples the components may exist on multiple computers or servers. The computing device 400 may store data in the data store 140 and/or may manage the storage of data stored in a separate computing device, for instance, through the I/O interface 406. The data store 140 may include physical memory such as a hard drive, an optical drive, a flash drive, an array of drives, or any combinations thereof, and may include volatile and/or non-volatile data storage.

The image processing platform 410 is depicted as including a training circuit 412, a model builder 414, a validation circuit 416, and a classifier 418. The processor 402, which may comprise a microprocessor, a micro-controller, an application specific integrated circuit (ASIC), Graphical Processing Unit (GPU) or the like, is to perform various processing functions in the computing device 400. The processing functions may include the functions of the training circuit 412, the model builder 414, the validation circuit 416, and the classifier 418 of the image processing platform 410.

The training circuit 412, for example, may create a training set from images of damaged property or objects. This training set may be used by the model builder 414 to build a CNN model. The model builder 414, for example, may build a CNN model on the training set according to a selected candidate architecture and candidate parameters for the CNN model. The validation circuit 416, for example, may evaluate performance of the CNN model built by the model builder 414 on a validation set and determine whether the CNN model meets a validation threshold. The classifier 418, for example, may classify an extent of damage for an object in each image in the validation set. The classifier may also aggregate predictions from an ensemble of optimized CNN models to more accurately assess the damaged objects in the digital images.

In an example, the image processing platform 410 includes machine readable instructions stored on a non-transitory computer readable medium 413 and executed by the processor 402. Examples of the non-transitory computer readable medium include dynamic random access memory (DRAM), electrically erasable programmable read-only memory (EEPROM), magnetoresistive random access memory (MRAM), memristor, flash memory, hard drive, and the like. The computer readable medium 413 may be included in the data store 140 or may be a separate storage device. In another example, the image processing platform 410 includes a hardware device, such as a circuit or multiple circuits arranged on a board. In this example, the training circuit 412, the model builder 414, the validation circuit 416, and the classifier 418 comprise circuit components or individual circuits, such as an embedded system, an ASIC, or a field-programmable gate array (FPGA).

The processor 402 may be coupled to the data store 140 and the I/O interface 406 by a bus 405 where the bus 405 may be a communication system that transfers data between various components of the computing device 400. In examples, the bus 405 may be a Peripheral Component Interconnect (PCI), Industry Standard Architecture (ISA), PCI-Express, HyperTransport®, NuBus, a proprietary bus, and the like.

The I/O interface 406 includes a hardware and/or a software interface. The I/O interface 406 may be a network interface connected to a network through a network device, over which the image processing platform 410 may receive and communicate information, for instance, information regarding an extent of damage to a property. For example, the input/output interface 406 may be a wireless local area network (WLAN) or a network interface controller (NIC). The WLAN may link the computing device 400 to the network device through a radio signal. Similarly, the NIC may link the computing device 400 to a network device through a physical connection, such as a cable. The computing device 400 may also link to a network device through a wireless wide area network (WWAN), which uses a mobile data signal to communicate with mobile phone towers. The processor 402 may store information received through the input/output interface 406 in the data store 140 and may use the information in implementing the training circuit 412, the model builder 414, the validation circuit 416, and the classifier 418 of the image processing platform 410.

The methods disclosed below in FIGS. 5 and 6 describe examples of methods for digital image processing using CNNs, for example, to classify an extent of damage to property captured in an image. It should be apparent to those of ordinary skill in the art that the methods represent generalized illustrations and that other sequences may be added or existing sequences may be removed, modified or rearranged without departing from the scopes of the methods.

Figure 5:
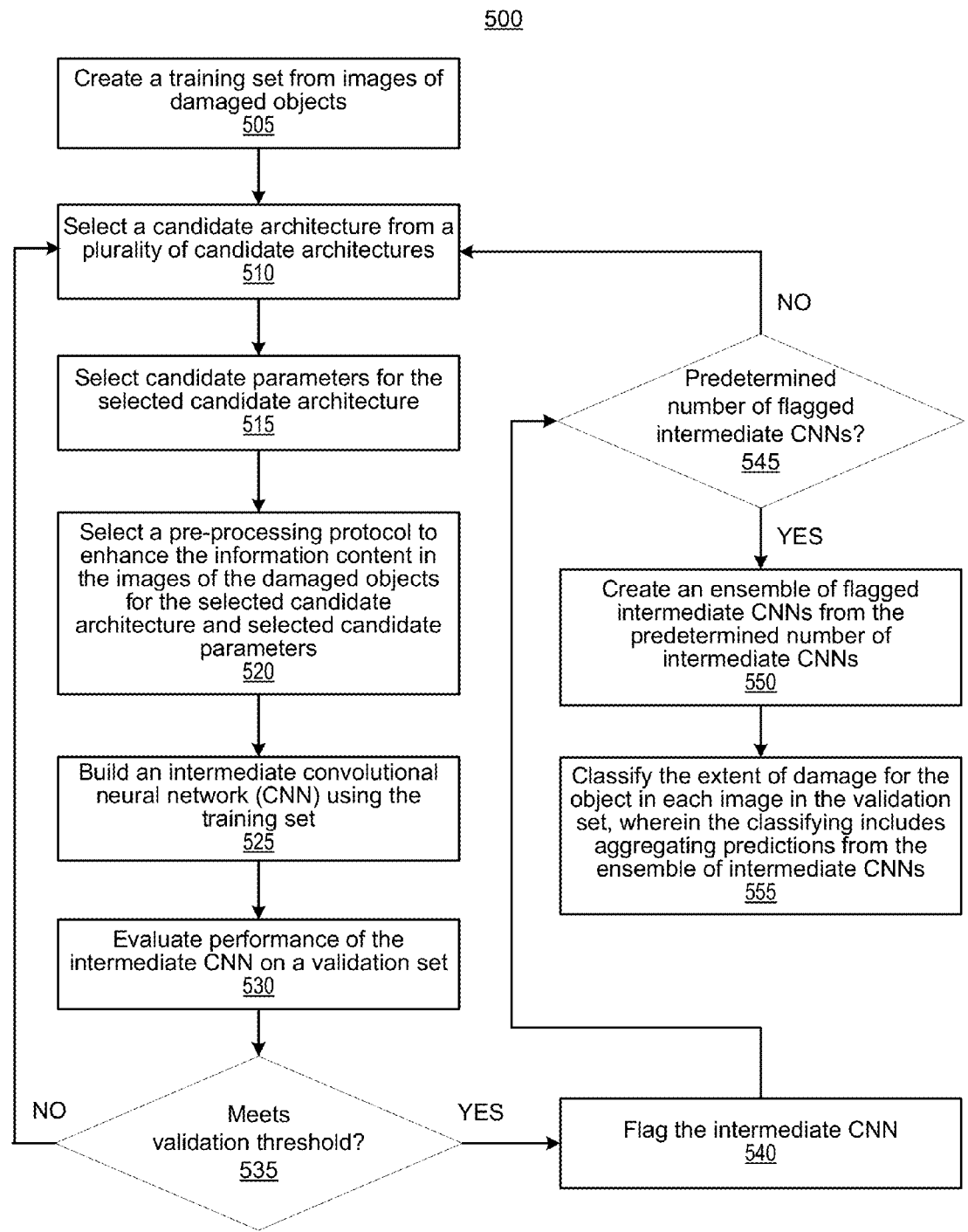
FIG. 5 shows a flow chart diagram of a method to classify objects in a digital image using CNNs, according to an example of the present disclosure.

FIG. 5 shows a flow chart diagram of a method 500 of digital image processing using CNNs, according to an example of the present disclosure. A CNN may be utilized to advance the performance of a classification of objects in an image. Accordingly, the method 500 illustrated in FIG. 5 provides a method for training and building CNNs to output an accurate classification of objects in an image. For example, the processor 402 of the image processing server 130 may implement the image processing platform 410 to accurately assess property damage in images.

In block 505, the training circuit 412, for instance, may create a training set from images of damaged property or objects. According to an example, the training set data may comprise images of new (undamaged) objects, damaged objects, and totaled objects. This training set may be processed by the model builder 414 to discover predictive relationships and tune a model such as a CNN.

After the training set has been created, the method 500 may iteratively select candidate architectures and candidate parameters to optimize the CNN's ability to, for example, accurately classify an extent of damage for an object in an image. The iterative process may include blocks 510-545 of method 500.

In block 510, the model builder 414, for instance, may select a candidate architecture from a plurality of candidate architectures. According to an example, the plurality of candidate architectures may include different combinations of a number of convolution layers and subsampling layers and a classifier type. The classifier type may include a multilayer perceptron (MLP), a support vector machine (SVM), and the like.

In block 515, the model builder 414, for instance, may select candidate parameters for the selected candidate architecture. According to an example, the candidate parameters may include a learning rate, a batch size, a maximum number of training epochs, a convolutional filter size, a number of feature maps at every layer of the CNN, a sub-sampling pool size, an input image size, a number of hidden layers, a number of units in each hidden layer, a selected classifier algorithm, and a number of output classes.

Examples of learning parameters include the learning rate, the batch size, and the maximum number of training epochs. The learning rate parameter is a rate at which the CNN learns optimal filter coefficients from the training set. Ideally, the learning rate is not too high (where the CNN overlearns and is less generalizable) or too low. According to an example, the range for the learning rate parameter includes, but is not limited to, 0.05 to 0.10. The batch size parameter is the number of images processed together (as opposed to using images one-at-a-time) when computing an estimate of a gradient descent in a minimization. Bunching a number of images in a batch during training speeds up the computing by using three-dimensional (3D) matrix representation (batch size×height×width) instead of a two-dimensional (2D) matrix representation of an image (height× width). According to an example, the range for the batch size parameter includes, but is not limited to, 2 to 128 images for each batch. The maximum number of training epochs parameter is the maximum number of times that the entire training set is re-used in updating minimization parameters. The number of training images divided by batch size is the total number of iterations in one epoch. According to an example, a range for the maximum number of training epochs parameter is between 100 and 200.

Examples of convolution and sub-sampling parameters include the convolutional filter size, the number of feature maps at each layer of the CNN, and the sub-sampling pool size. The convolutional filter size parameter is the size of the filters in a convolution layer. According to an example, the range for the convolutional filter size parameter is between 2×2 pixels and 114×114 pixels. The number of feature maps parameter is the number of feature maps output from the number of filters or kernels in each convolution layer. According to an example, the range for the number of feature maps parameter is between 60 to 512 feature maps for a first convolutional layer. The sub-sampling pool size parameter is the size of a square patch of pixels in the image down-sampled into, and replaced by, one pixel after the operation via maximum pooling, which sets the value of the resulting pixel as the maximum value of the pixels in the initial square patch of pixels. According to an example, the range of values for the sub-sampling pool size parameter includes, but is not limited to, a range between 2×2 to 4×4. The parameters of the network of the convolutional layers are selected to reduce the input image size into 1×1 pixel value on the output of the final convolutional layer according to an example.

Examples of classifier parameters include the image input size, the number of hidden layers, the number of units in each layer, the selected classifier algorithm, and the number of output classes. The image input size is the dimension of the space where the data from the final convolution layer will be classified, and is therefore equal to the product of the number of feature maps and the image size of the last convolution layer. According to an example, the input image size is the number of feature maps on the last convolutional layer times 1×1. The hidden layers are fully connected MLP layers, and the number of hidden layers includes 2 according to an example. The number of hidden layers should be limited to three hidden layers at most. The number of units in each hidden layer is the number of units in a hidden layer that uses the information learned in the convolution and subsampling layers to detect the extent of damage. According to an example, the range for the number units in each hidden layer parameter includes, but is not limited to between 6 and 1024 units. The selected classifier algorithm may include, but is not limited to, multilayer perceptron (MLP), a support vector machine (SVM), and the like. The number of output classes is the number of classes the input images are classified into. According to an example, the number of output classes may include, but is not limited to, 3.

The model builder 414, for instance, may then select a pre-processing protocol to enhance the information content in the images of the damaged objects for the selected candidate architecture and selected candidate parameters as shown in block 520. The pre-processing protocol may include, but is not limited to, local contrast normalization or Zero-phase Component Analysis (ZCA) scaling, and independent component analysis (ICA) for whitening.

In block 525, the model builder 414, for instance, may train and build an intermediate CNN using the training set. After the intermediate CNN is trained and built, the validation circuit 416, for instance, may evaluate the performance of the intermediate CNN on a validation set as shown in block 530. According to an example, the validation set comprises a set of images of new (undamaged) objects, damaged objects, and totaled objects that are separate and distinct from the set of images from the training set. In this regard, the validation set is used to assess the accuracy of the intermediate CNN with respect to classifying the extent of damage in each of the images of the validation set.

In block 535, the validation circuit 416, for instance, may determine whether the intermediate CNN meets a validation threshold. The validation threshold may be a validation error rate. According to this example, the intermediate CNN may meet or satisfy the validation threshold if its validation error rate is less than 20% with respect to classification predictions. If the intermediate CNN does not meet the validation threshold then the iterative process begins again at block 510.

On the other hand, if the intermediate CNN meets the validation threshold, then validation circuit 416 may flag the intermediate CNN to indicate that it has met the validation threshold as shown in block 540. In block 545, the validation circuit 416 may determine whether a predetermined number of intermediate CNNs have been flagged as meeting the validation threshold. The predetermined number of flagged intermediate CNNs for example may be 25 flagged intermediate CNNs. According to an example, each of the flagged intermediate CNNs are built with different values for the selected candidate parameters. If the number of flagged intermediate CNNs has not reached the predetermined number (e.g., 25), then the iterative process begins again at block 510.

Alternatively, if the number of flagged intermediate CNNs has reached the predetermined number (e.g., 25), then the validation circuit 416 may create an ensemble of intermediate CNNs from the predetermined number of intermediate CNNs as shown in block 550. For example, the 5 most accurate intermediate CNNs may be selected as an ensemble.

In block 555, the classifier 418, for instance, may classify the extent of damage for the object in each image in the validation set. According to an example, the classifying includes aggregating predictions from the ensemble of flagged intermediate CNNs to achieve greater accuracy in the classification of the extent of damage for the object in each image in the validation set. For example, aggregating predictions or taking a majority vote from the ensemble of flagged intermediate CNNs may result in an accuracy of approximately 90%, which is much above an individual CNN performance results of approximately 80-85%

Figure 6:
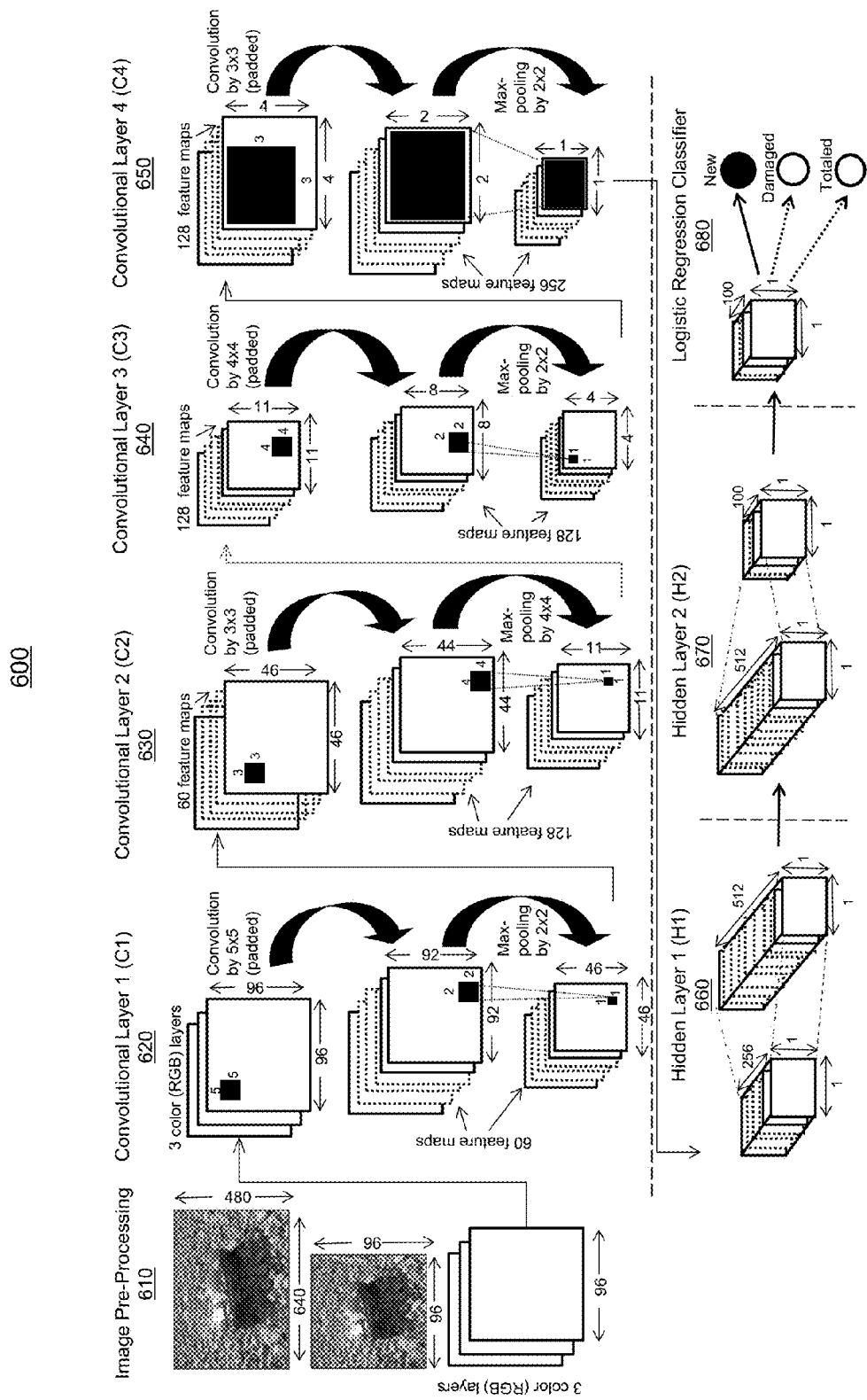
FIG. 6 shows a flow chart diagram of an optimized CNN, according to an example of the present disclosure.

FIG. 6 shows a flow chart diagram of an optimized convolutional neural network (CNN) 600, according to an example of the present disclosure. The CNN 600 is an optimized CNN that was built according to the method 500 described above. The architecture for this CNN 600 includes 4 convolution and sub-sampling layers, 2 hidden layers, and a logistic regression classifier, such as a MLP. In this regard, for instance, this CNN 600 may classify the extent of damage to property that is captured in an image with an accuracy of approximately 88%.

As discussed above, an insured customer may submit an image of property in a claim to an insurance company. The insurance company may utilize this CNN 600 to automatically classify the extent of damage to the property using the submitted image. For example, the submitted image may be input into the CNN 600.

The submitted image of the damaged property may be pre-processed 610 to enhance the information content in the image for processing by the CNN 600. In this example, the submitted image is 480×640 pixels. For example, the pre-processing 610 may crop the submitted image of the damaged property to 96×96 pixels and extract 3 RGB channel layers from the submitted image of the damaged property to present as an input image to the CNN 600.

In the first convolutional layer (C1) 620, the CNN 600 may convolve the input image with 60 different first layer filters, each of size 5×5, to produce 60 feature maps of size 92×92. Each filter application of a convolution layer reduces the resolution of the input image. If input image is of resolution N×N, convolution filter is of size M×M, then resulting image will be of resolution N−M+1×N−M+1. The CNN 600 may then perform a max-pooling on the feature maps, which is a form of non-linear sub-sampling. Max-pooling partitions the input image into a set of non-overlapping square patches, replacing each patch with a single pixel of value equal to the maximum value of all the pixels in the initial square patch. In an example, the CNN may perform a max-pooling over a 2×2 region of the 60 feature maps on C1 620. The resulting 60 feature maps of size 46×46 in C1 620 are then further convolved and max-pooled in the second convolutional layer (C2) 630.

In C2 630, the resulting 60 feature maps of size 46×46 from C1 620 are convolved with second layer convolutional filters, each of size 3×3, to produce 128 feature maps of size 44×44. A max-pooling may then be performed over a 4×4 region of the 128 feature maps. The resulting 128 feature maps of size 11×11 in C2 630 are then further convolved and max-pooled in the third convolutional layer (C3) 640.

In C3 640, the resulting 128 feature maps of size 11×11 from C2 630 are convolved with third layer convolutional filters, each of size 4×4, to produce 128 feature maps of size 8×8. A max-pooling may then be performed over a 2×2 region of the 128 feature maps. The resulting 128 feature maps of size 4×4 in C3 640 are then further convolved and max-pooled in the fourth convolutional layer (C4) 650.

In C4 650, the resulting 128 feature maps of size 4×4 from C3 640 are convolved with fourth layer filters, each of size 3×3, to produce 256 feature maps of size 2×2. A max-pooling may then be performed over a 2×2 region of the 256 feature maps. The resulting 256 feature maps of size 1×1 in C4 650 are then input to the first hidden layer (H1) 660 to initiate the classification process.

To perform classification, CNN 600 applies fully-connected neural-network layers behind the convolutional layers. In the first classification layer of H1 660, for example, each of the 512 units takes in a value of every pixel from all 256 feature maps resulting from C4 650, multiplies each value by a predetermined weight, and de-linearizes the sum. In effect, the output of each of the 512 units, for example, represents a judgment about the originally submitted image of the damaged property e. The second hidden layer (H2) 670 is added to derive more abstract conclusions about the submitted image of the damaged property from the output of each of the 100 units in the second classification layer of H2 670. As a result, the logistic regression classifier 680 of the CNN 600 may then accurately classify the extent of damage of the property in the submitted image as either new, damaged, or totaled according to the output of the 3 units in the third classification layer.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method of classifying a damaged object, the method comprising:
    creating a training set of images from images of a damaged object;
    selecting a candidate architecture and candidate parameters for a convolutional neural network (CNN) to classify the extent of damage of the object in the training set of images through an iterative process, wherein the candidate architecture includes convolution layers, sub-sampling layers, and a classifier type, and wherein the iterative process comprises:
        selecting the candidate architecture from a plurality of candidate architectures;
        selecting the candidate parameters for the selected candidate architecture, wherein the selected candidate parameters include a learning rate, a batch size, a maximum number of training epochs, an input image size, a number of feature maps at each of the convolution layers and sub-sampling layers, a convolutional filter size, a sub-sampling pool size, a defined number of hidden layers, a number of units in each of the hidden layers, a selected classifier algorithm, and a number of output classes;
        selecting a pre-processing protocol to enhance information content in the training set of images of the damaged object for the selected candidate architecture and selected candidate parameters, wherein the preprocessing protocol includes cropping the images and extracting a defined number of RGB channel layers from the images;
        building an intermediate CNN using the training set;
        evaluating performance of the intermediate CNN on a validation set of images, the validation set of images comprising images of undamaged objects, damaged objects, and totaled objects, wherein the validation set of images is separate and distinct from the training set of images;
        determining whether the intermediate CNN meets a validation threshold; and
        repeating the iterative process until a predetermined number of intermediate CNNs meet the validation threshold, wherein each intermediate CNN has different values for the selected candidate parameters;
    creating an ensemble of intermediate CNNs from the predetermined number of intermediate CNNs; and
    classifying the extent of damage for the object in each image in the validation set, wherein the classifying includes aggregating predictions from the ensemble of intermediate CNNs.

2. The method of claim 1, wherein the learning rate is between 0.05 and 0.1, the batch size is between 2 and 128 images, and the maximum number of training epochs is between 100 and 200.

3. The method of claim 1, wherein the candidate parameters include convolution and sub-sampling parameters, wherein the convolution and sub-sampling parameters include at a convolutional filter size, a number of feature maps, and a sub-sampling pool size.

4. The method of claim 3, wherein the convolutional filter size is between 2×2 pixels and 114×114 pixels, the number of feature maps in a first convolutional layer is between 60 and 512, and the sub-sampling pool size is between 2×2 pixels and 4×4 pixels.

5. The method of claim 1, wherein the image input size is a number equal to a product of a number of feature maps and an image size of a last convolutional layer, the number of hidden layers is 2, the number of units in each hidden layer is between 6 and 1024 units, the selected classifier algorithm being a multilayer perceptron (MLP) algorithm, and the number of output classes is 3.

6. The method of claim 1, wherein determining whether the intermediate CNN meets the validation threshold comprises determining whether the intermediate CNN has an error rate of less than 20% on the validation set.

7. The method of claim 1, wherein the predetermined number of intermediate CNNs is 25.

8. A damage classifying server comprising:
a processor; and
a memory storing machine readable instructions that are to cause the processor to:
  create a training set of images from images of a damaged object;
  select a candidate architecture and candidate parameters for a convolutional neural network (CNN) to classify the extent of damage of the object in the image through an iterative process, wherein the candidate architecture includes convolution layers, subsampling layers, and a classifier type, and wherein the iterative process comprises:
    selecting the candidate architecture from a plurality of candidate architectures;
    selecting the candidate parameters for the selected candidate architecture, wherein the selected candidate parameters include a learning rate, a batch size, a maximum number of training epochs, an input image size, a number of feature maps at each of the convolution layers and sub-sampling layers, a convolutional filter size, a sub-sampling pool size, a defined number of hidden layers, a number of units in each of the hidden layers, a selected classifier algorithm, and a number of output classes;
    selecting a pre-processing protocol to enhance information content in the training set of images of the damaged object for the selected candidate architecture and selected candidate parameters, wherein the preprocessing protocol includes cropping the images and extracting a defined number of RGB channel layers from the images;
    building an intermediate CNN using the training set;
    evaluating performance of the intermediate CNN on a validation set of images comprising images of undamaged objects, damaged objects, and totaled objects, wherein the validation set of images is separate and distinct from the training set of images, and
    repeating the iterative process until it is determined that a predetermined number of intermediate CNNs meet a validation threshold, wherein each intermediate CNN has different values for the selected candidate parameters;
  create an ensemble of intermediate CNNs from the predetermined number of intermediate CNNs; and
  classify the extent of damage for the object in each image in the validation set, wherein to classify is to aggregate predictions from the ensemble of intermediate CNNs.

9. The damage classifying server of claim 8, wherein the machine readable instructions cause the processor to:
select the learning rate between 0.05 and 0.1, the batch size between 2 and 128 images, the maximum number of training epochs between 100 and 200, the convolutional filter size between 2×2 pixels and 114×114 pixels, the number of feature maps in a first convolutional layer between 60 and 512, the sub-sampling pool size between 2×2 pixels and 4×4 pixels, the number of hidden layers at 2, the number of units in each hidden layer between 6 and 1024 units, a classifier algorithm as a multilayer perceptron (MLP) algorithm, and the number of output classes as 3.

10. The damage classifying server of claim 8, wherein to determine whether the intermediate CNN meets the validation threshold, the machine readable instructions cause the processor to determine whether the intermediate CNN has an error rate of less than 20% on the validation set.

11. The damage classifying server of claim 8, wherein the predetermined number of intermediate CNNs is 25.

12. A non-transitory computer readable medium to classify a damaged object, the non-transitory computer readable medium including machine readable instructions executable by a processor to:
  create a training set of images from images of a damaged object;
  select a candidate architecture and candidate parameters for a convolutional neural network (CNN) to classify the extent of damage for of the object in the image through an iterative process, wherein the candidate architecture includes convolution layers, sub sampling layers, and a classifier type, and wherein the iterative process comprises:
    selecting the candidate architecture from a plurality of candidate architectures;
    selecting the candidate parameters for the selected candidate architecture, wherein the selected candidate parameters include a learning rate, a batch size, a maximum number of training epochs, an input image size, a number of feature maps at each of the convolution layers and sub-sampling layers, a convolutional filter size, a sub-sampling pool size, a defined number of hidden layers, a number of units in each of the hidden layers, a selected classifier algorithm, and a number of output classes;
    selecting a pre-processing protocol to enhance information content in the training set of images of the damaged object for the selected candidate architecture and selected candidate parameters, wherein the preprocessing protocol includes cropping the images and extracting a defined number of RGB channel layers from the images;
    building an intermediate CNN using the training set;
    evaluating performance of the intermediate CNN on a validation set of images comprising images of undamaged objects, damaged objects, and totaled objects, wherein the validation set of images is separate and distinct from the training set of images, and
    repeating the iterative process until it is determined that a predetermined number of intermediate CNNs meet a validation threshold, wherein each intermediate CNN has different values for the selected candidate parameters;
  create an ensemble of intermediate CNNs from the predetermined number of intermediate CNNs; and
  classify the extent of damage for the object in each image in the validation set, wherein to classify is to aggregate predictions from the ensemble of intermediate CNNs.

13. The non-transitory computer readable medium of claim 12, wherein to select candidate parameters, the machine readable instructions are executable by the processor to:

select the learning rate between 0.05 and 0.1, the batch size between 2 and 128 images, the maximum number of training epochs between 100 and 200, the convolutional filter size between 2×2 pixels and 114×114 pixels, the number of feature maps in a first convolutional layer between 60 and 512, the sub-sampling pool size between 2×2 pixels and 4×4 pixels, the number of hidden layers at 2, the number of units in each hidden layer between 6 and 1024 units, a classifier algorithm as a multilayer perceptron (MLP) algorithm, and the number of output classes as 3.

* * * * *

UNITED STATES PATENT AND TRADEMARK OFFICE
CERTIFICATE OF CORRECTION

PATENT NO.         : 9,524,450 B2
APPLICATION NO.    : 14/638873
DATED              : December 20, 2016
INVENTOR(S)        : Arun Ravindran et al.

It is certified that error appears in the above-identified patent and that said Letters Patent is hereby corrected as shown below:

In the Claims

In Column 10, Line 11, Claim 1, "sub-sampling" should read "subsampling".

In Column 12, Line 23, Claim 12, "for of the object" should read "of the object".

In Column 12, Line 25, Claim 12, "sub sampling" should read "subsampling".

Signed and Sealed this
Fourteenth Day of March, 2017

Michelle K. Lee
*Director of the United States Patent and Trademark Office*